United States Patent
Konate et al.

(10) Patent No.: US 11,981,549 B2
(45) Date of Patent: May 14, 2024

(54) CRANE, ESPECIALLY FOR OFFSHORE APPLICATION

(71) Applicant: REEL, Saint-Cyr-Au-Mont-d'Or (FR)

(72) Inventors: Karamoko Konate, Saint-Rogatien (FR); Bart Burger, Nieuw-Vennep (NL)

(73) Assignee: REEL, Saint-Cyr-au-Mont-d'Or (FR)

(*) Notice: Subject to any disclaimer, the term of this patent is extended or adjusted under 35 U.S.C. 154(b) by 28 days.

(21) Appl. No.: 17/692,976

(22) Filed: Mar. 11, 2022

(65) Prior Publication Data
US 2022/0289531 A1    Sep. 15, 2022

(30) Foreign Application Priority Data

Mar. 12, 2021 (FR) ...................................... 2102455

(51) Int. Cl.
*B66C 23/84* (2006.01)
*B66C 23/52* (2006.01)
(Continued)

(52) U.S. Cl.
CPC .............. *B66C 23/84* (2013.01); *B66C 23/52* (2013.01); *F16C 19/381* (2013.01); *F16C 19/505* (2013.01); *F16C 19/56* (2013.01); *F16C 33/60* (2013.01); *F16C 2300/14* (2013.01); *F16C 2326/30* (2013.01)

(58) Field of Classification Search
CPC ....... B66C 23/84; B66C 23/52; F16C 19/381; F16C 19/505; F16C 19/56; F16C 2326/30; F16C 19/28; F16C 19/54; F16C 19/50; F16C 19/507; F16C 29/0626; F16C 29/065; F16C 2326/00; F16C 2300/14; F16C 23/082; F16C 23/084; F16C 19/546

See application file for complete search history.

(56) References Cited

U.S. PATENT DOCUMENTS 253,679 A * 2/1882 Bussing ............... F16C 29/0614
                                                    384/451
560,322 A * 5/1896 McGloin ................. F16C 19/50
                                                    384/451
(Continued)

FOREIGN PATENT DOCUMENTS

CN        101343021 A    1/2009
GB        2 177 374      1/1987
(Continued)

OTHER PUBLICATIONS

Search Report for FR2012455, dated Nov. 19, 2021, 1 page.

*Primary Examiner* — Michael R Mansen
*Assistant Examiner* — Juan J Campos, Jr.
(74) *Attorney, Agent, or Firm* — NIXON & VANDERHYE (57) ABSTRACT

Disclosed is a crane, in particular for offshore application. The crane includes a bearing the assembly between a pedestal and a carrier frame. The bearings are distributed over the height of the support structure and include upper bearing, which include a radial contact rolling bearing including rolling elements and a smooth cylindrical raceway, coaxial to the axis of rotation. The radial contact rolling bearing allows a longitudinal translational degree of freedom of the rolling elements over the height of the cylindrical raceway.

19 Claims, 6 Drawing Sheets

(51) Int. Cl.
*F16C 19/38* (2006.01)
*F16C 19/50* (2006.01)
*F16C 19/56* (2006.01)
*F16C 33/60* (2006.01)

(56) References Cited

U.S. PATENT DOCUMENTS

| | | | | |
|---|---|---|---|---|
| 575,618 | A * | 1/1897 | Schon | F16C 19/50 384/451 |
| 667,684 | A * | 2/1901 | Deharde | F16C 33/50 384/451 |
| 4,126,361 | A * | 11/1978 | Bottner | E02F 9/121 384/455 |
| 4,248,488 | A * | 2/1981 | Sable | B66C 23/84 384/593 |
| 4,395,140 | A * | 7/1983 | Sable | F16C 19/381 384/593 |
| 4,553,794 | A * | 11/1985 | Teramachi | F16C 29/0626 384/44 |
| 6,203,200 | B1 * | 3/2001 | Teramachi | F16C 29/001 384/44 |
| 6,217,217 | B1 * | 4/2001 | Teramachi | F16C 29/065 384/44 |
| 6,357,921 | B1 * | 3/2002 | Dittenhofer | F16C 33/6659 384/455 |
| 8,002,472 | B2 * | 8/2011 | Craig | F16C 33/7886 384/455 |
| 8,540,092 | B2 | 9/2013 | Roodenburg et al. | |
| 8,997,611 | B1 * | 4/2015 | Walton | B23Q 1/527 82/128 |
| 9,394,944 | B2 * | 7/2016 | Bienfang | E02F 3/46 |
| 9,593,719 | B2 * | 3/2017 | Ban | F16C 33/585 |
| 2006/0029305 | A1 * | 2/2006 | Akiyama | F16C 29/065 384/45 |
| 2007/0133910 | A1 * | 6/2007 | Xu | F16C 29/065 384/44 |
| 2012/0020792 | A1 * | 1/2012 | Frank | F16C 19/49 416/169 R |
| 2018/0283362 | A1 * | 10/2018 | Minadeo | F16C 33/60 |

FOREIGN PATENT DOCUMENTS

| | | |
|---|---|---|
| WO | 2011/036406 A1 | 3/2011 |
| WO | 2014/101910 | 7/2014 |

\* cited by examiner

CRANE, ESPECIALLY FOR OFFSHORE APPLICATION

This application claims priority benefit under 35 U.S.C. § 119(a-d) from French Patent Application No. FR 2102455 filed Mar. 12, 2021, the entire contents of each of which are hereby incorporated by reference herein in their entirety.

BACKGROUND OF THE INVENTION

Field of the Invention

The present invention relates to the technical field of cranes, advantageously for lifting loads of more than 20 tons, in particular for offshore application.

Description of the Related Art

In offshore application, most heavy lift cranes are assembled with the vessel by a swivel connection. This swivel assembly allows the crane to rotate with respect to the vessel. This is called "slewing motion".

This rotational degree of freedom allows the crane to cover a large area of the deck and to move the hook outward.

The heavy lift cranes then use the vessel as a counter-weight and thus transfer a very large load through the swivel connection.

As loads handled at sea become more and more important (both in weight and height), the loads transferred through the swivel connection are also increased.

In such a swivel connection, three types of loads are transferred.

The crane weight and the load weight introduce an axial load on the swivel connection.

The distance of the load with respect to the crane centre creates a bending moment. The distance between the centre of gravity of the crane weight and the axis of rotation also contributes to this bending moment.

The lateral loads generated by roll, pitch and wind create a radial load on the swivel connection.

Heavy lift cranes then use different technologies to allow rotational motion while resisting these different loads.

A first, traditional solution uses bogies (axles mounted on each of the four corners of the crane) to transfer the load onto a circular rail on the ship side.

A second solution is based on slewing rolling bearings, which have become large enough to also serve part of the heavy load segment. However, this is a very expensive solution because it requires extreme machining accuracy on very large parts and very large surfaces.

A third solution consists of mast cranes, in which the load is distributed over two bearings: a first bearing located at the boom connection point and a second bearing located at the hoisting cable connection point.

The advantage of this technology is load reduction by rolling, which makes it more cost effective and less cumbersome (platform).

However, a relationship exists between the boom length and the mast height, which leads to very high masts for long boom cranes. The mast height above water makes it impossible to pass bridges in major sea lanes, such as the Bosphorus.

SUMMARY OF THE INVENTION

In order to remedy the above-mentioned drawback of the state of the art, the present invention proposes a new crane structure, advantageously for lifting loads of more than 20 tons, in particular for offshore application.

The crane according to the invention comprises:
a boom, and
a support structure, intended to carry said boom.
The support structure comprises:
a pedestal, forming a stator, and
a carrier frame, forming a rotor, carrying said boom and housed within said pedestal,
bearing means for the assembly between said pedestal and said carrier frame, defining an axis of rotation of said carrier frame with respect to said pedestal, advantageously a vertical axis of rotation,
rotation operating means, adapted to control the rotation of said carrier frame about said axis of rotation.

And, according to the invention, said bearing means are distributed over the height of said support structure and comprise:
upper bearing means, located on the side of the boom and advantageously at an upper end of said pedestal, and
lower bearing means, located under the upper bearing means and advantageously at a lower end of the carrier frame.

The upper bearing means comprise a radial contact rolling bearing, comprising:
rolling elements, and
a smooth cylindrical raceway, coaxial to the axis of rotation, said radial contact rolling bearing allowing a longitudinal translational degree of freedom of said rolling elements along the height of said cylindrical raceway.

The technical solution according to the invention has for interest to, surprisingly and unexpectedly, offer an efficient guidance of the rotational motion while resisting to the different loads.

In particular, the upper bearing means allow a certain deformation of the carrier frame under the effect of the different loads, while maintaining optimal guidance in rotation. This solution according to the invention has moreover for interest to offer an optimal compactness with, for a same capacity, a smaller diameter compared to a slewing ring.

Other non-limitative and advantageous features of the product according to the invention, taken individually or according to all the technically possible combinations, are the following:
said radial contact rolling bearing comprises rolling elements selected from cylindrical rollers, distributed in at least one row, or a series of wheels, for example in the form of carriages or bogies; the cylindrical rollers are advantageously connected to each other to form at least one chain of cylindrical rollers; the upper bearing means advantageously include several bearing modules each including at least one chain of cylindrical rollers and, within each bearing module, the chain of cylindrical rollers forms a chain of recirculating cylindrical rollers having an active strand cooperating with the cylindrical raceway and a return strand, said bearing modules being distributed over the circumference of the axis of rotation;
the rolling elements are carried by the carrier frame, and the cylindrical raceway is carried by the pedestal and directed towards the axis of rotation;
the lower bearing means comprise a radial contact rolling bearing, advantageously overlying, and a thrust bearing, advantageously underlying; the lower bearing means advantageously have a spherical central point, so as to obtain a single point of articulation; the radial contact rolling bearing advantageously consists of a spherical bearing, advantageously selected from the spherical roller bearings or a spherical friction bearing, the thrust bearing consists of a concave tapered roller bearing, said spherical bearing and said tapered roller bearing having a common central point passed through by the axis of rotation;

the rotation operating means are implanted at the lower bearing means;

said crane is a land crane or an offshore crane.

The present invention also relates to a craft for offshore application, equipped with a crane according to the invention, for example a wind farm Service Operation Vessel (SOV).

The craft advantageously consists of a vessel, in which the pedestal is fastened to a deck of said craft, projecting above said deck. The upper bearing means are located above said deck and the lower bearing means are located above, at or below said deck.

Of course, the different features, alternatives and embodiments of the invention can be associated with each other according to various combinations, insofar as they are not incompatible or exclusive with respect to each other.

BRIEF DESCRIPTION OF THE DRAWINGS

Moreover, various other features of the invention emerge from the appended description made with reference to the drawings that illustrate non-limitative embodiments of the invention, and wherein.

DESCRIPTION OF THE PREFERRED EMBODIMENTS

It is to be noted that, in these figures, the structural and/or functional elements common to the different alternatives can have the same references numbers.

The crane 1, as shown in the figures, advantageously consists of a crane for lifting loads of more than 20 tons (for example more than 400 tons and up to at least 10 000 tons, or even more), in particular for offshore application ("offshore heavy lift").

Generally, the crane 1 is advantageously a land crane or an offshore crane.

Preferably, the crane 1 is devoid of counterweights on the rotating part intended to minimize the bending moment transfer.

Figure 1:
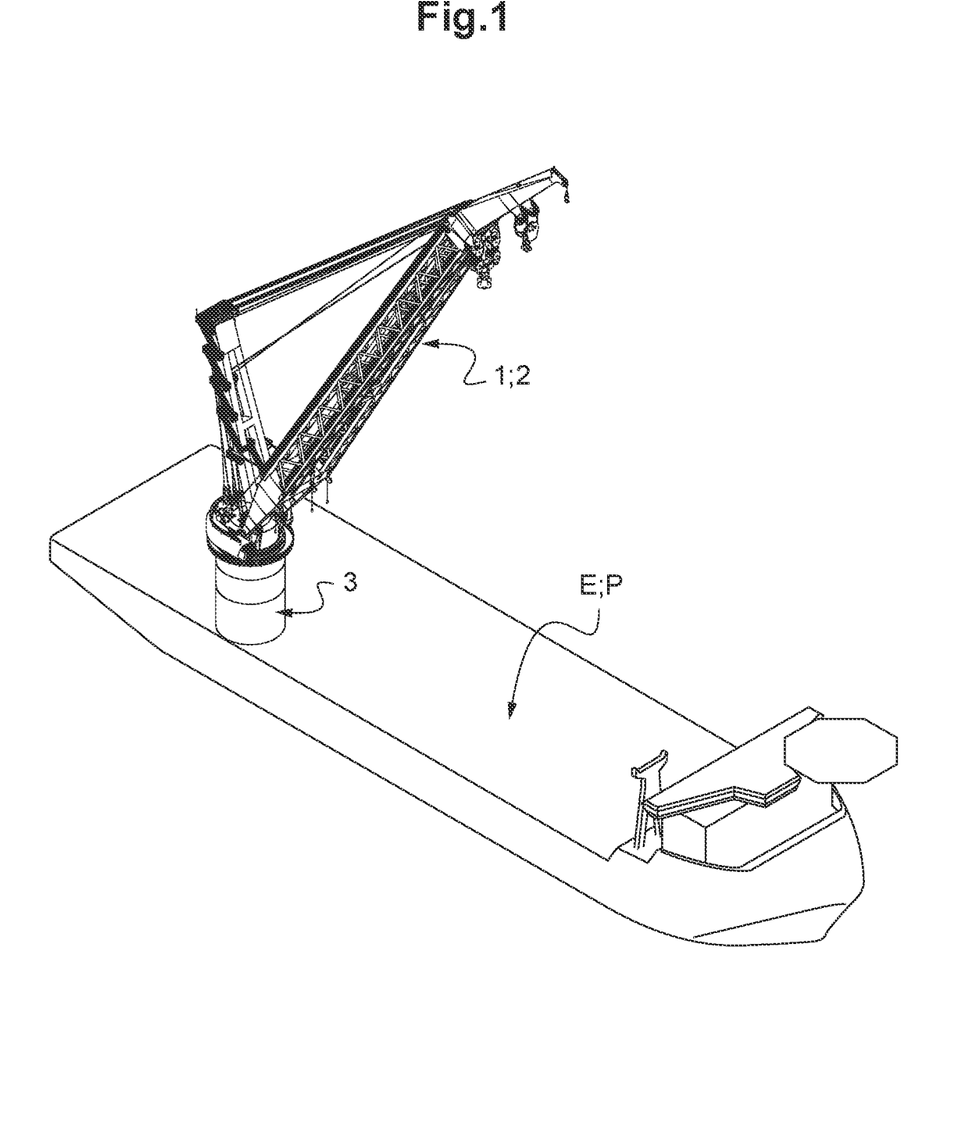
FIG. 1 is a schematic and perspective view illustrating a vessel equipped with a crane according to the invention.
Figure 2:
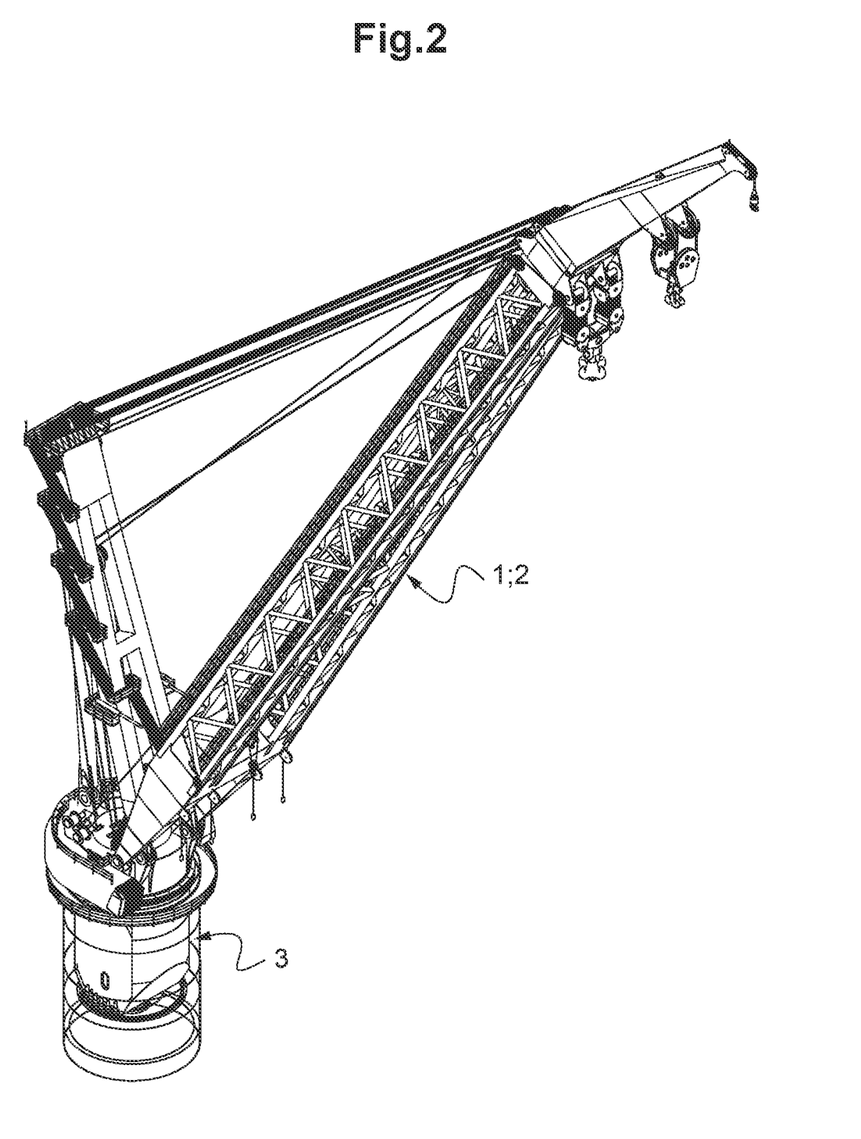
FIG. 2 is a schematic and perspective view of the crane according to the invention, isolated from the vessel.
Figure 3:
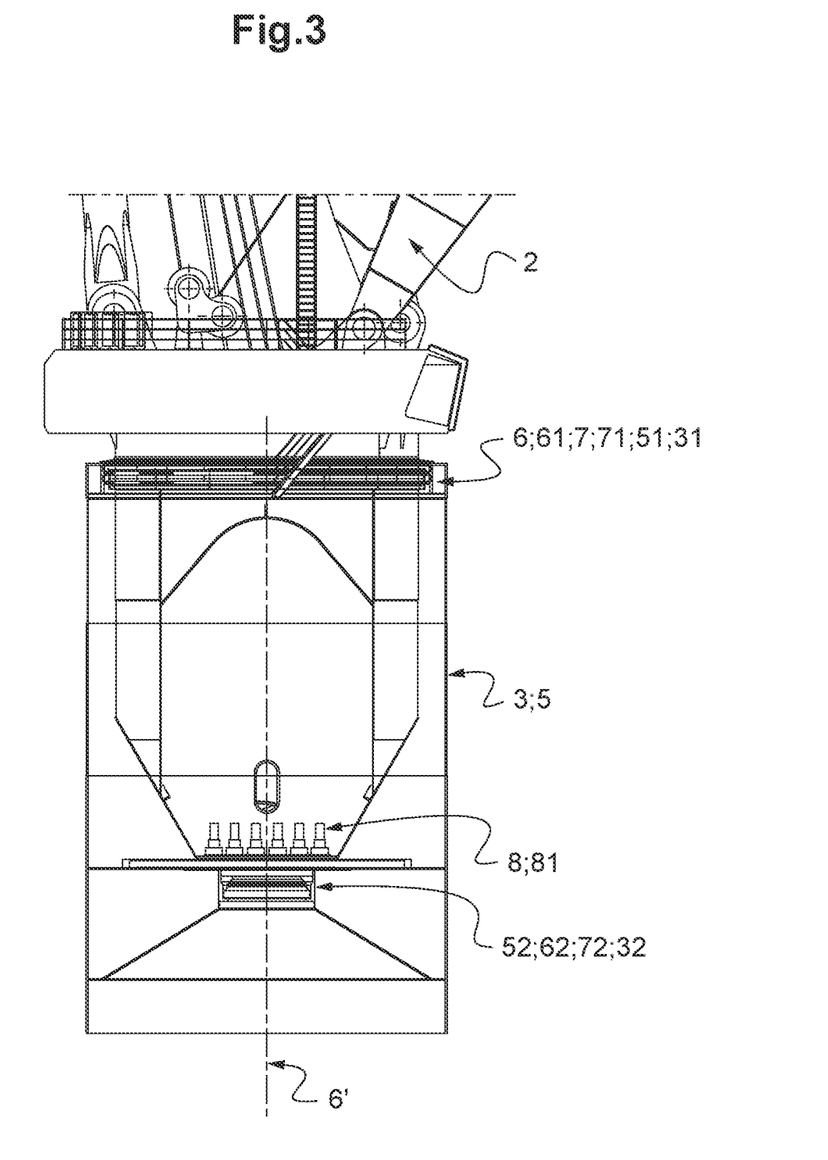
FIG. 3 is a schematic and partial view of the crane according to the invention, illustrating the support structure thereof.

As generally shown in FIGS. 1 to 3, the crane 1 comprises:
a boom 2, and
a support structure 3, intended to carry this boom 2.

Figure 4:
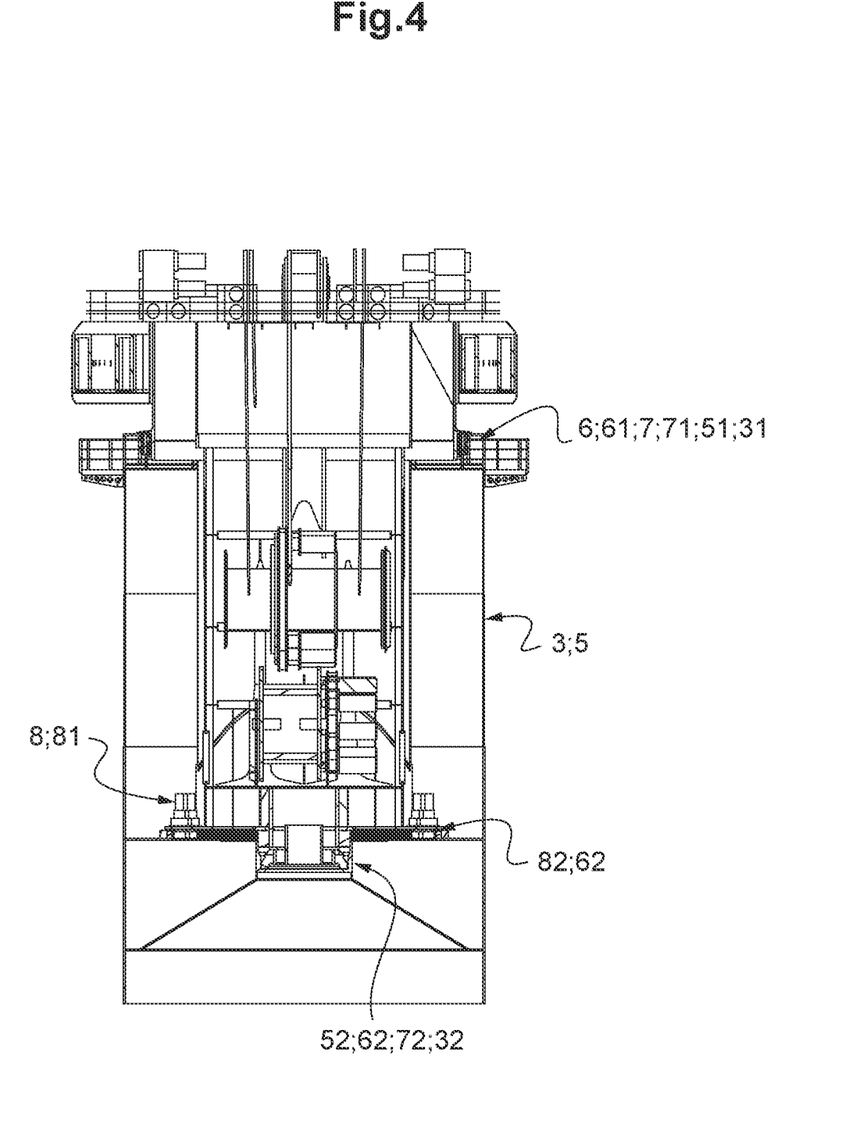
FIG. 4 is another schematic and partial view of the crane according to the invention, illustrating the support structure thereof.

As illustrated in FIGS. 3 and 4, the support structure 3 comprises:
a pedestal 5, forming a stator, and
a carrier frame 6, forming a rotor, carrying the boom 2 and housed within the pedestal 5.

The pedestal 5 advantageously has a tubular structure or barrel structure (male), into which is added/fitted the carrier frame 6 (female).

The pedestal 5 advantageously has two ends (FIG. 3):
an upper end 51, located on the side of the boom 2, and
an opposite, lower end 52.

The carrier frame 6 here forms an insert, added/fitted into the pedestal 5.

The carrier frame 6 advantageously has two ends (FIG. 3):
an upper end 61, carrying the boom 2, and
an opposite, lower end 62.

The support structure 3 also has two ends:
an upper end 31, located on the side of the boom 2, and
an opposite, lower end 32.

The support structure 3 also has bearing means 7 for the assembly between the pedestal 5 and the carrier frame 6.

The bearing means 7 define an axis of rotation 6' of the carrier frame 6 (and thus of the boom 2) with respect to the pedestal 5, advantageously a vertical axis of rotation 6'.

The support structure 3 also comprises rotation operating means 8, for controlling the carrier frame 6 about its axis of rotation 6'.

Preferably, the rotation operating means 8 consist of a combination of motors 81, synchronized with each other, which are carried by the pedestal 5 and that control the rotation of the carrier frame 6 with respect to the pedestal 5 (FIG. 3).

The motors 81 are advantageously distributed over a part of the circumference of the pedestal 5.

And, according to the invention, as described hereafter in relation with FIG. 3 and following, the bearing means 7 are distributed over the height of the support structure 3.

Herein, the bearing means 7 comprise:
upper bearing means 71, located on the side of the boom 2 and advantageously at the upper end 51 of the pedestal 5, and
lower bearing means 72, located under the upper bearing means 71 and advantageously at the lower end 62 of the carrier frame 6.

Preferably, the total construction of the bearing means 7 is statically determined (therefore non-hyperstatic).

Still preferably, the axial load is transferred through the construction of the lower bearing means 72. The moment is transferred by both the upper 71 and lower 72 bearing means.

The upper 71 and lower 72 bearing means can be either roller bearings or slide bearings, made of metal or synthetic material.

The upper bearing means 71 are advantageously located at the upper end 51 of the pedestal 5 (top of the pedestal 5). They are advantageously placed between the upper end 51 of the pedestal 5 and the upper end 61 of the carrier frame 6.

In other words, the upper bearing means 71 are advantageously located at the swivel point of the boom 2.

Figure 5:
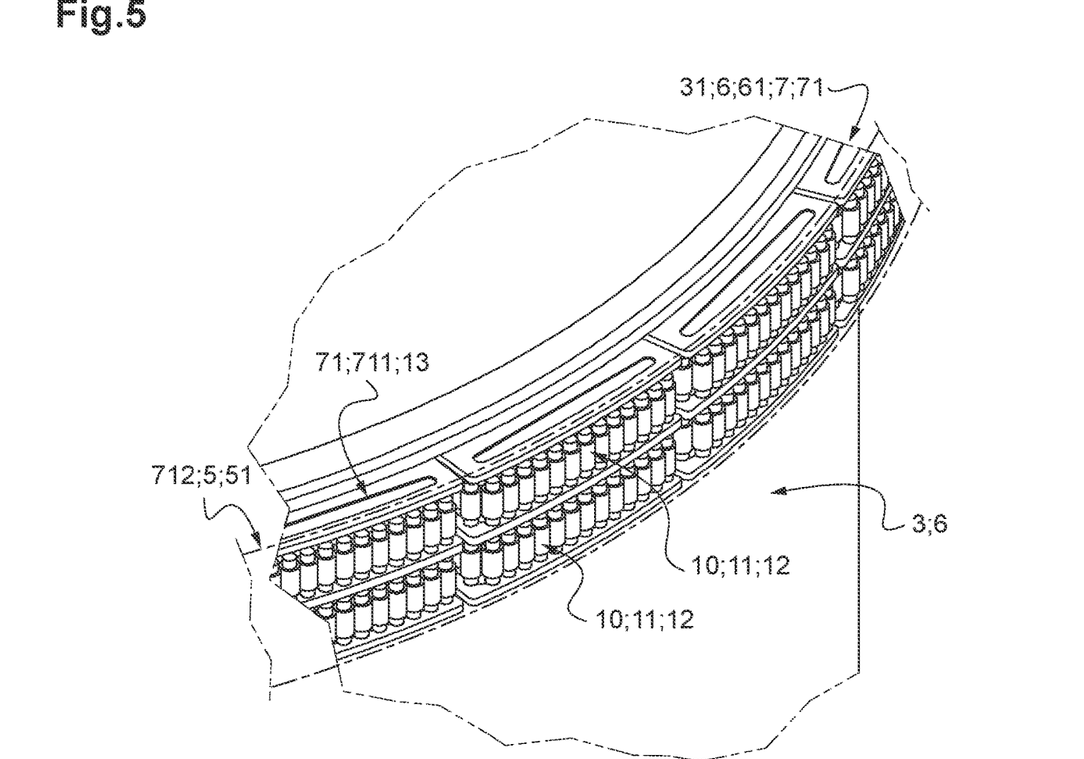
FIG. 5 is a schematic and partial view of the crane according to the invention, illustrating the structure of the rolling elements constituting the upper bearing means.

As illustrated in particular in FIG. 5, the upper bearing means 71 comprise a radial contact rolling bearing 71 (denoted by the same reference number 71 for the sake of simplification) comprising:
  rolling elements 711, and
  a smooth cylindrical raceway 712, coaxial to the axis of rotation 6'.

And the radial contact rolling bearing 71 allows a longitudinal translational degree of freedom of the rolling elements 711 along the height of the cylindrical raceway 712.

By "longitudinal translational degree of freedom", also said "axial translational degree of freedom", the rolling elements 711 are adapted to move along a direction coaxial to the axis of rotation 6' of the carrier frame 6 (advantageously vertically), in translation with respect to the fixed cylindrical raceway 712.

The general plane of the rolling elements 711, perpendicular to the axis of rotation 6', is therefore mobile along the height of the cylindrical raceway 712 (between these opposite, upper and lower ends).

By "height", it is advantageously meant a dimension measured parallel to the axis of the rotation 6.

The longitudinal translational degree of freedom of the rolling elements 711 is advantageously of 0.5 to 5 cm.

The height of the cylindrical raceway 712 is hence higher than the height of the rolling elements 711.

In other words, when the crane 1 is subjected to loads, in particular a bending motion and/or an axial load, the rolling elements 711 are allowed to move (here vertically) along the height of the cylindrical raceway 712, while maintaining optimal guidance in rotation.

The cylindrical raceway 712 advantageously consists of a tubular section, with a circular cross-section, adapted to serve as a rolling surface for the rolling elements 711 during the rotation of the carrier frame 6 (and thus of the boom 2) with respect to the pedestal 5.

This cylindrical raceway 712 is advantageously coaxial to the axis of rotation 6' of the carrier frame 6.

The rolling elements 711 are advantageously selected from cylindrical rollers 10, distributed in at least one row 11 (or ring).

Each cylindrical roller 10 herein has a longitudinal axis 10', forming its axis of rotation and extending parallel to the axis of rotation 6' of the carrier frame 6.

A row 11 of cylindrical rollers 10 advantageously extends in a plane perpendicular to the axis of rotation 6'.

Herein, the rolling elements 711 are distributed in two superimposed rows 11 (or rings).

The cylindrical rollers 10 are advantageously connected (at their longitudinal ends) in such a way as to form at least one chain 12 of cylindrical rollers 10.

Figure 6:
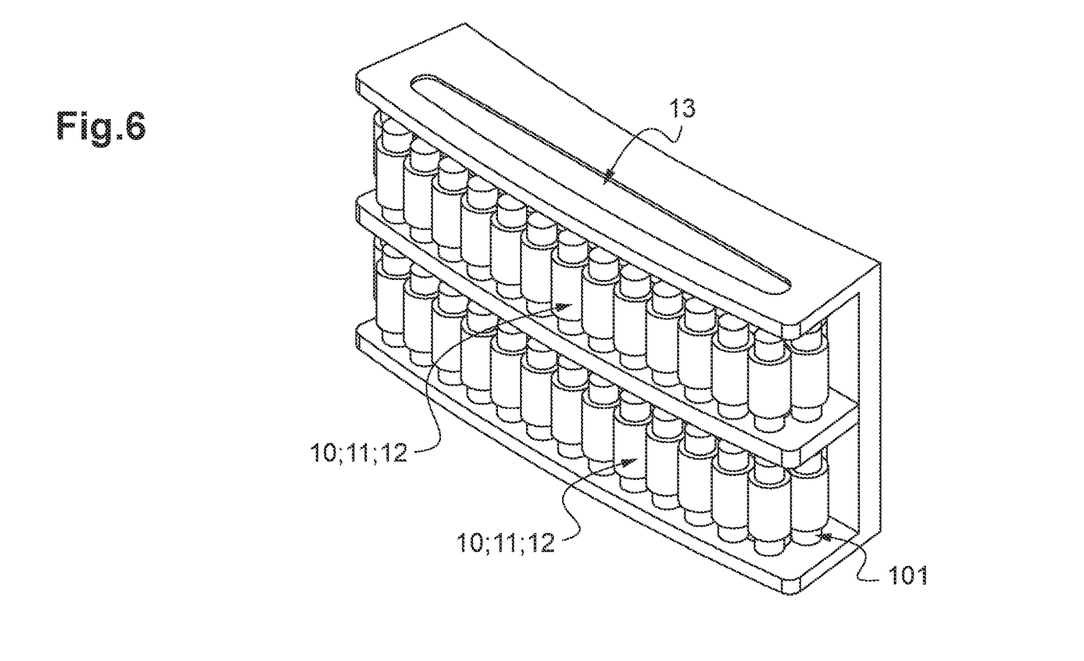
FIG. 6 is a schematic and perspective view of a bearing module constituting the rolling elements according to FIG. 5.

These cylindrical rollers 10 are advantageously connected by links 101, to maintain the spacing between the successive cylindrical rollers 10 (FIG. 6).

Herein, the rolling elements 711 advantageously include several bearing modules 13 each including at least one chain 12 of cylindrical rollers 10.

Each bearing module 13 here comprises two superimposed chains 12 of cylindrical rollers 10.

Figure 7:
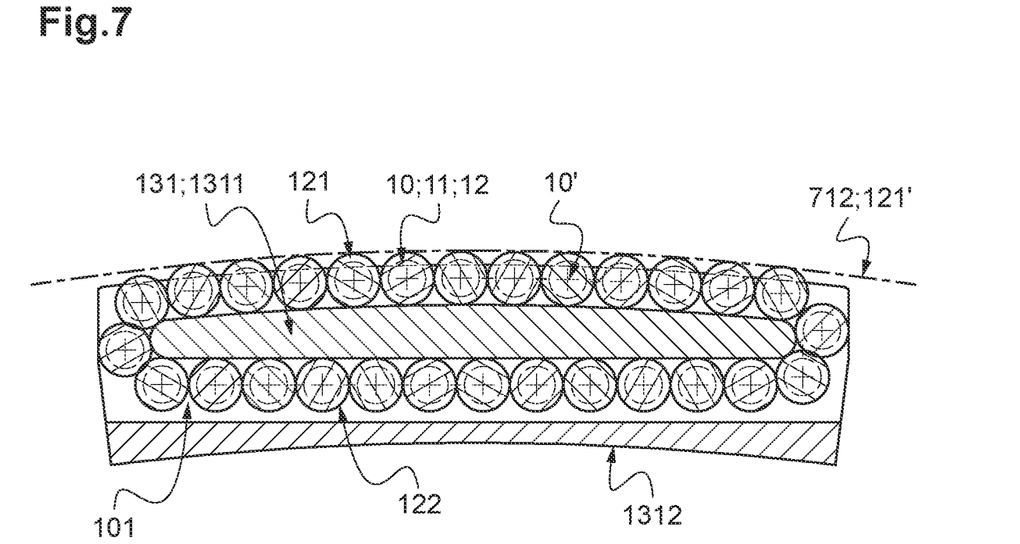
FIG. 7 is a schematic and cross-sectional view of a bearing module constituting the rolling elements according to FIG. 5.

Within each bearing module 13, and as illustrated in FIG. 7, the chain 12 of cylindrical rollers 10 consists of a chain 12 of recirculating cylindrical rollers 10 having:
  an active strand 121 cooperating with the cylindrical raceway 712, and
  a return strand 122.

Herein, the active strand 121 defines a tangential surface 121' having a circular cross-section whose radius of curvature corresponds to the cylindrical raceway 712.

The return strand 122 is advantageously rectilinear.

For that purpose, the bearing module 13 advantageously includes a support frame 131 having two parts:
  a guiding part 1311, guiding the chain 12 of recirculating cylindrical rollers 10 and defining the shape of the strands 121, 122 of the chain 12 of recirculating cylindrical rollers 10, and
  a mounting part 1312, here concave and cylindrical, adapted for its mounting to the support structure 3.
The bearing modules 13 are distributed, in series, over the circumference of the axis of rotation 6', in a juxtaposed manner with respect to each other.

The juxtaposed bearing modules 13 thus form a kind of ring of rolling elements 711.

The active strands 121 of the bearing modules 13 thus define together a circular tangential surface 121' whose radius of curvature corresponds to the cylindrical raceway 712.

The active strands 121 of the bearing modules 13 thus define together a circular tangential surface 121' that is concentrical with the axis of rotation 6' of the carrier frame 6.

As an alternative, the rolling elements 711 are advantageously selected from a series of wheels (not shown), for example in the form of carriages or bogies.

Generally, the rolling elements 711 are advantageously carried by the carrier frame 6.

In the case of bearing modules 13, the mounting part 1312 are assembled with the carrier frame 6. The active strands 121 of the bearing modules 13 advantageously define together an inner circular tangential surface 121', directed towards the periphery.

The active strands 121 of the bearing modules 13 hence define together an inner circular tangential surface 121', facing away from the axis of rotation 6'.

And the outer cylindrical raceway 712 is carried by the pedestal 5 and is directed towards the axis of rotation 6'.

Still generally, the lower bearing means 72 are advantageously located at the lower end 62 of the carrier frame 6. They are advantageously placed between the lower end 52 of the pedestal 5 and the lower end 62 of the carrier frame 6.

Figure 8:
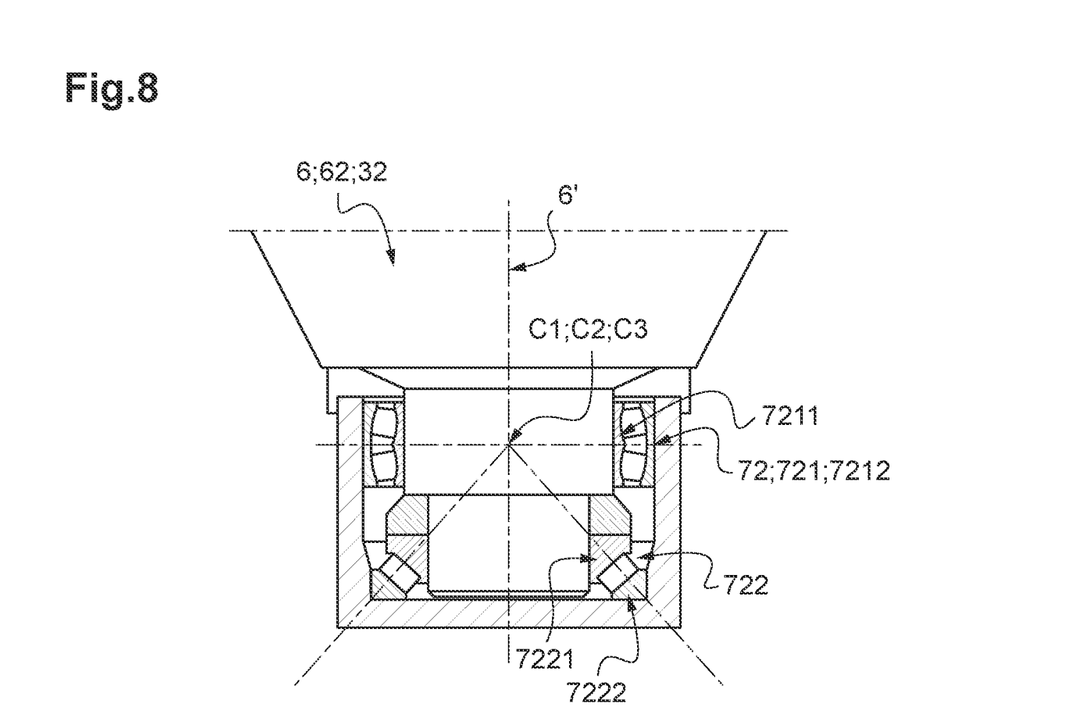
FIG. 8 is a schematic and cross-sectional view of the lower bearing means.

The lower bearing means 72 can be consisted of one or several rolling bearing/bearings, having a spherical central point C3, in such a way as to obtain a single point of articulation.

The lower bearing means 72 advantageously comprise:
  a radial contact rolling bearing 721, advantageously overlying, and
  a thrust bearing 722, advantageously underlying.

This combination is interesting in that it allows for optimal support of the efforts: the radial effort is supported by the radial contact rolling bearing 721 and the axial effort is supported by the thrust bearing 722.

The radial contact rolling bearing 721 advantageously consists of a spherical bearing 721, advantageously selected from the spherical roller bearings or a spherical friction bearing.

For example, a spherical roller bearing comprises two rows of rollers, a common spherical raceway in the outer ring 7212 and two raceways in continuous grooves on the inner ring 7211.

Generally, the spherical bearing 721 therefore accepts a relative tilt, a movement of the inner ring 7211 (washershaft) with respect to the outer ring 7212 (washer-housing), perpendicular to the axis of rotation 6'.

For example, the admissible tilt angle is of 1.5° to 2°.

The spherical bearing 721 therefore defines a central point C1, passed through by the axis of rotation 6'.

The thrust bearing 722 advantageously consists of a concave tapered roller bearing.

This concave tapered roller bearing 722 also defines a central point C2, corresponding to the apex of the cone defined by a base line perpendicular to the axis of rotation of the rollers, passed through by the axis of rotation 6'.

For example, the concave tapered roller bearing 722 includes a row of rollers, a truncated raceway (diverging from the bottom to the top) in the inner ring 7221 and a raceway in a truncated continuous groove (advantageously parallel) in the outer ring 7222.

The thrust bearing 722 ensures the holding of the carrier frame 6 in the axial direction and avoids any move along its axis.

The central points C1 and C2 are advantageously merged with each other, defining a common central point C3 corresponding to the spherical central point C3.

The common central point C3 is advantageously passed through by the axis of rotation 6'.

Generally, the rotation operating means 8 are advantageously implanted at the above-mentioned lower bearing means 72.

The motors 81 of the rotation operating means 8 advantageously cooperate with a gear wheel 82 fitted to the lower end 62 of the carrier frame 6 (FIG. 4).

Generally, as shown in FIG. 1, the crane 1 is advantageously installed on a craft E for offshore application, for example a wind farm Service Operation Vessel (SOV).

In the case of a vessel (FIG. 1), the pedestal 5 is advantageously fastened to an edge P of the craft E, projecting above this edge P.

And the upper bearing means 71 are located above this edge P.

The lower bearing means 72 may have different locations with respect to this edge P.

The lower bearing means 72 may be located:
above said edge P,
at said edge P, or
under said edge P.

Generally, the crane 1 according to the invention has different advantages:
the bearing means are smaller in diameter than the solutions of the prior art, which reduces the size of the crane and therefore increases the deck space for cargo;
the bolted connection, which is used in a single swivel bearing construction, is eliminated; the risk associated to this connection, considered as a major concern, is thus eliminated;
the height of the pedestal is lower than the height of the mast of a mast crane and the pedestal can be more easily dismantled to be even lower, which allows the vessel to pass bridges in major sea lanes, such as the Bosphorus Bridge at the entrance to the Black Sea;
the construction of the bearing means has a lower cost and a better producibility than a single rolling bearing solution;
the bearing means are located inside the pedestal, between the carrier frame and the pedestal; the bearing means are hence in a protected environment rather than in open sea, which is the case for bogie or mast cranes.

Of course, various other modifications can be made to the invention within the scope of the appended claims.

The invention claimed is:

1. A crane, comprising:
a boom,
a support structure, intended to carry said boom, wherein said support structure comprises:
a pedestal, forming a stator,
a carrier frame, forming a rotor, carrying said boom and housed within said pedestal,
bearing means for the assembly between said pedestal and said carrier frame, defining an axis of rotation of said carrier frame with respect to said pedestal, and
rotation operating means, adapted to control the rotation of said carrier frame about said axis of rotation,
wherein said bearing means are distributed over the height of said support structure and comprise:
upper bearing means, located on the side of the boom, and
lower bearing means, located under the upper bearing means,
wherein said upper bearing means comprise a radial contact rolling bearing, comprising:
rolling elements, and
a smooth cylindrical raceway, coaxial to the axis of rotation,
said radial contact rolling bearing being arranged to allow a longitudinal translational degree of freedom of said rolling elements along the height of said cylindrical raceway,
wherein the lower bearing means include:
a radial contact rolling bearing, and
a thrust bearing,
wherein the radial contact rolling bearing consists of a spherical bearing,
wherein the thrust bearing consists of a concave tapered roller bearing, and
wherein said spherical bearing and said tapered roller bearing have a common central point passed through by the axis of rotation.

2. The crane according to claim 1, wherein said radial contact rolling bearing comprises rolling elements selected from:
cylindrical rollers, distributed in at least one row, or
a series of wheels.

3. The crane according to claim 2, wherein the cylindrical rollers are connected to each other to form at least one chain of cylindrical rollers.

4. The crane according to claim 3, wherein the upper bearing means include several bearing modules each including at least one chain of cylindrical rollers, and
wherein, within each bearing module, the chain of cylindrical rollers forms a chain of recirculating cylindrical rollers that have:
an active strand cooperating with the cylindrical raceway, and
a return strand,
wherein said bearing modules are distributed over the circumference of the axis of rotation.

5. The crane of claim 2, wherein the series of wheels comprises carriages or bogies.

6. The crane according to claim 1, wherein the rolling elements are carried by the carrier frame, and
wherein the cylindrical raceway is carried by the pedestal and is directed towards the axis of rotation.

7. The crane according to claim 1, wherein the rotation operating means are implanted at the lower bearing means.

8. The crane according to claim 1, wherein said crane is a land crane or an offshore crane.

9. A craft for offshore application, equipped with a crane according to claim 1.

10. The craft according to claim 9, consisting of a vessel, wherein the pedestal is fastened to a deck of said craft, projecting above said deck,
   wherein the upper bearing means are located above said deck, and
   wherein the lower bearing means are located above, at or below said deck.

11. The crane according to claim 1, wherein the axis of rotation of said carrier frame with respect to said pedestal is a vertical axis of rotation.

12. The crane according to claim 1, wherein the upper bearing means is located on the side of the boom and at an upper end of said pedestal.

13. The crane according to claim 1, wherein the lower bearing means is located under the upper bearing means and at a lower end of the carrier frame.

14. The crane of claim 1, wherein the axis of rotation defined by the bearing means is a vertical axis, the upper bearing means is disposed at an upper end of the pedestal, and the lower bearing means is disposed at a lower end of the carrier frame.

15. The crane according to claim 1, wherein the lower bearing means include:
   an overlying radial contact rolling bearing, and
   an underlying thrust bearing.

16. The crane of claim 1, wherein the radial contact rolling bearing is a spherical roller bearing or spherical friction bearing.

17. A wind farm Service Operation Vessel for offshore application, equipped with a crane according to claim 1.

18. The crane according to claim 1, wherein the lower bearing means is located at a lower end of the carrier frame.

19. The crane according to claim 1, wherein the lower bearing means have a spherical central point, so as to obtain a single point of articulation.

\* \* \* \* \*